(12) United States Patent
Kuzminskiy et al.

(10) Patent No.: US 6,697,351 B1
(45) Date of Patent: Feb. 24, 2004

(54) FILTER FOR TELECOMMUNICATIONS SYSTEM

(75) Inventors: Alexandr Kuzminskiy, Swindon (GB); Paul Edward Strauch, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 450 days.

(21) Appl. No.: 09/704,484

(22) Filed: Nov. 2, 2000

(30) Foreign Application Priority Data

Nov. 9, 1999 (EP) ............................................. 99308919

(51) Int. Cl.[7] .............................. H04J 3/00; H04J 3/06; H04B 7/212
(52) U.S. Cl. ........................ 370/345; 370/347; 370/350
(58) Field of Search .................................. 370/345, 347, 370/350, 349

(56) References Cited

U.S. PATENT DOCUMENTS 6,002,716 A * 12/1999 Meyer et al. ................ 375/231
6,567,374 B1 * 5/2003 Böhnke et al. .............. 370/203

FOREIGN PATENT DOCUMENTS

| EP | 0 535 403 A1 | 9/1992 | ........... H04L/25/30 |
| EP | 0 615 352 A1 | 3/1994 | ........... H04B/7/005 |
| WO | WO 97/41702 | 11/1997 | ........... H04Q/7/34 |

OTHER PUBLICATIONS

A. Kuzminskiy, et al "Semi–Blind Training–Like Estimation Of Spatio–Temporal Filter Coefficients For Finite Alphabet Signals" "9th IEEE Signal Processing Workshop On Statistical Signal and Array Processing" Portland, OR, U.S.A. Sep. 14–16. 1998 pp. 376–379.

A. Kuzminskiy, et al "Semiblind Estimation of Spatio–Temporal Filter Coefficients Based on a Training–Like Approach" "IEEE Signal Processing Letters, Sep. 1998" pp. 231–233.

European Search Report, dated Apr. 17, 2000.

* cited by examiner

Primary Examiner—Vivian Chin
Assistant Examiner—Yuwen Pan

(57) ABSTRACT

In a radio telecommunications system such as GSM or EDGE, at each timeslot a small number of information symbols in narrow bands of the data payloads adjacent each tail of the timeslot are used as training-like symbols; for each burst, the end of the timeslot more affected by asynchronous CCI is sensed, and the training-like symbols at that end are processed, together with conventional midamble training symbols and tails symbols, by a CCI rejection algorithm.

8 Claims, 6 Drawing Sheets

FILTER FOR TELECOMMUNICATIONS SYSTEM

CROSS-REFERENCE TO RELATED APPLICATION

This application claims priority of European Patent Application No. 99308919.2, which was filed on Nov. 9, 1999.

FIELD OF THE INVENTION

This invention relates to a method and apparatus for filtering signals in a radio telecommunications system.

DESCRIPTION OF THE RELATED ART

In a radio telecommunications base station, the provision of adaptive or smart antennas is known to enhance capacity, mainly because such antennas have good Co-Channel Interference (CCI) rejection capability. However perfect timeslot synchronization is assumed between a desired signal and interfering signals, and small cells must be used to allow the application of standard antenna array processing techniques.

In a system in which timeslots are not synchronized, such as GSM (Global System for Mobile Communications) and EDGE (Enhanced Data Rates for GSM Evolution), or when large cells are employed, such assumptions cannot be made.

FIG. 1 illustrates a plot of amplitude A versus time t of a desired signal D, comprising a tail band T at each end, two pay loads P, and a midamble training sequence S. FIG. 1 also shows 2 interfering signals, the first $I_1$ being of substantially greater amplitude than the second $I_2$, and there being a break point B between them.

The CCI of FIG. 1 can be considered as a nonstationary interference, and corresponding nonstationary processing techniques can be applied, as proposed by J Karlsson, "Adaptive antennas in GSM systems with non-synchronized base stations" Licentiate's thesis, Dept of Signals, Sensors and Systems, Royal Inst. Of Technology, Sweden, 1997, and by E Villier, L. Lopes, S Aftelak, "On application of uplink optimum combining to base station reception" in Proc. IEEE 48$^{th}$ VTC, pp747–752, Ottawa, 1998. A drawback of such an approach is that the techniques are not effective when a limited volume of data is available, such as the 148 symbols in a GSM timeslot.

In M C Wells, "Increasing the capacity of GSM cellular radio using adaptive antennas", IEE Proc. Communications, vol 143, no.5, pp 304–310, 1996, it is pointed out that a Spatio-Temporal Filter (STF) can be used to enhance the desired signal D and reject both parts $I_1$ and $I_2$ of the asynchronous CCI. However conventional adjustment algorithms such as the Least Squares (LS) estimation may not be effective when the training sequence is concentrated in one part of the burst, as in GSM. It can be seen from FIG. 1 that the training sequence S overlaps with the interfering signal $I_2$, but there is no overlap with $I_1$.

A solution would be to spread the training sequence S over the whole burst while keeping the total number of training symbols constant, but this would require a change of the GSM standard, which is not possible.

Another solution would be to use the symbols in the tails T as additional training symbols for CCI rejection, but this may be insufficient because there are not enough symbols.

Another solution, also proposed by Wells is to use a semi-blind algorithm with projection to the Finite Alphabet (FA); the FA property is associated with the whole timeslot of the desired signal and can be used to adjust the coefficients of a STF in asynchronous CCI conditions. This semi-blind solution uses the LS estimation based on only the training symbols as an initialization, and thus the estimator may still suffer from insufficient volume of training data overlapping part of the asynchronous CCI. Referring to FIG. 1, in GSM there will be 26 symbols available in the training sequence S, plus 3 from the right hand tail, to train an STF to reject the relatively weak interference $I_2$, but only 3 symbols in the left hand tail T to reject the stronger interference $I_1$.

A M Kusminskiy and D Hatzinakos, in "Semi-blind estimation of spatio-temporal filter coefficients based on a training-like approach", IEEE Signal Processing Letters, vol.5 no.9 pp231–233, September 1998, propose a potential method for improving accuracy by finding a solution close to that based on an enlarged number of training symbols displaced to any position within a received slot of data, but a drawback is that complexity may be high because it increases exponentially with the number of additional training-like symbols in a slot.

A need exists for a method and apparatus for filtering signals which overcomes the disadvantages of the known methods.

SUMMARY OF THE INVENTION

In a radio telecommunications system in which each timeslot has a first tail band, a first data payload, a midamble sequence of training symbols, a second data payload, and a second tail band, in accordance with the invention a method and apparatus for filtering signals by determining which of the two ends of a timeslot suffers more from co-channel interference than the other end, selecting as training-like symbols a plurality of symbols in the data payload adjacent the tail band at said end, and utilizing the training-like symbols, the tail band symbols at said end, and the midamble training symbols in an algorithm to reject co-channel interference.

In this specification, a "training-like symbol" means an information symbol of any possible value which can be used to enlarge the available number of training data, i.e. the midamble training symbols and the tail band symbols of FIGS. 1 and 2.

BRIEF DESCRIPTION OF THE DRAWINGS

The invention will be described by way of example only with reference to FIGS. 2–6 in which.

DETAILED DESCRIPTION

Figure 2:
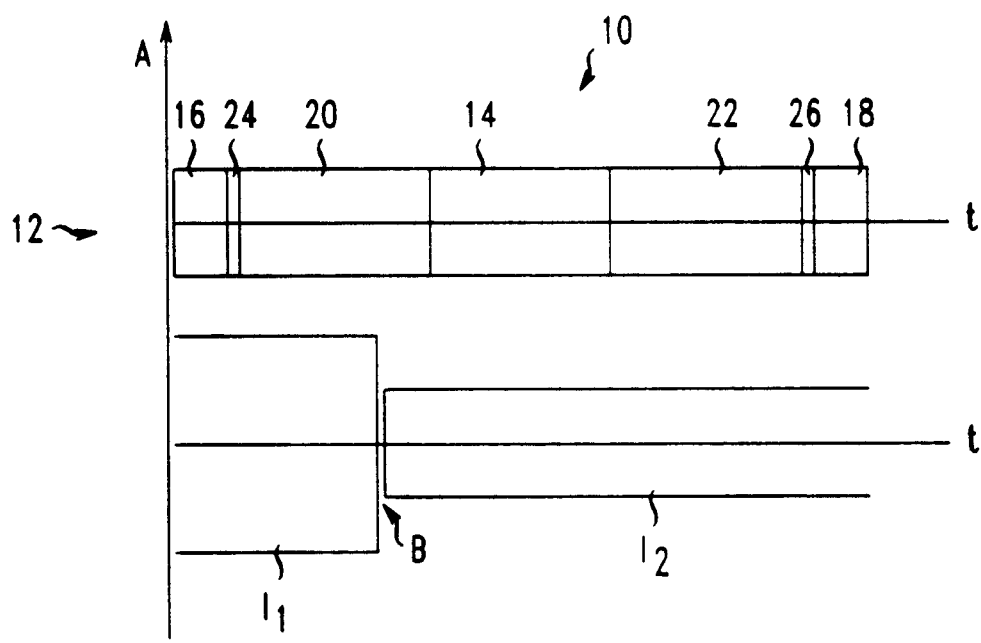
FIG. 2 illustrates a desired signal indicating two bands containing information symbols which may be used as training-like symbols, and two CCIs.

FIG. 2 illustrates a timeslot 10 of a received signal 12 structured to have a midamble training sequence 14, tail bands 16, 18 at either end, and between the tails and the training sequence, two data payloads 20, 22.

Inside the payloads 20, 22 there are two bands 24, 26 adjacent the tails 16,18 containing information symbols which may be used for training, i.e., training-like symbols.

Figure 1:
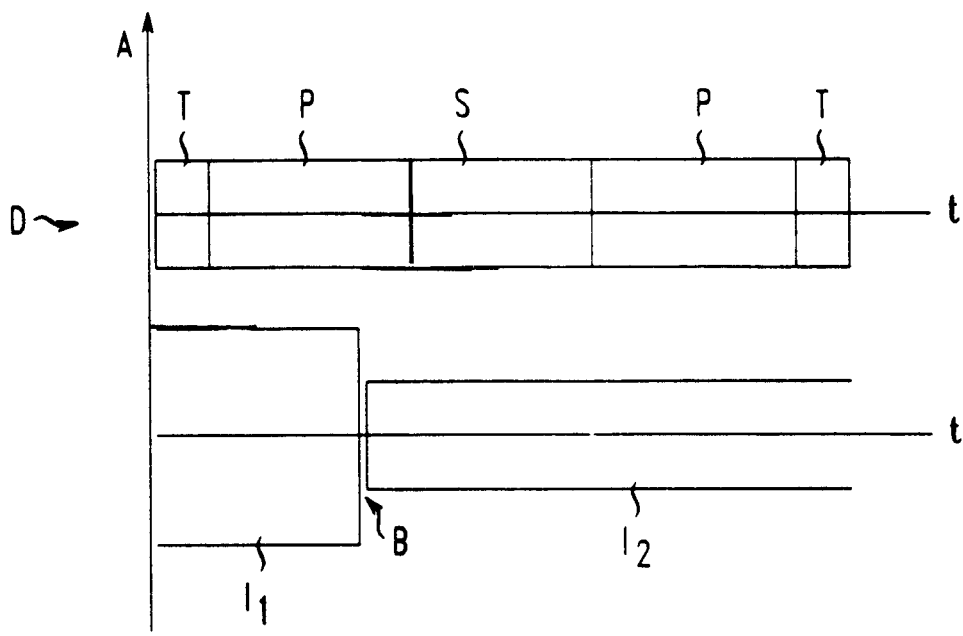
FIG. 1 is a typical template of a desired signal and two co-channel interfering signals.

Two interfering signals $I_1$ $I_2$ of different intensities are shown as in FIG. 1.

Figure 3:
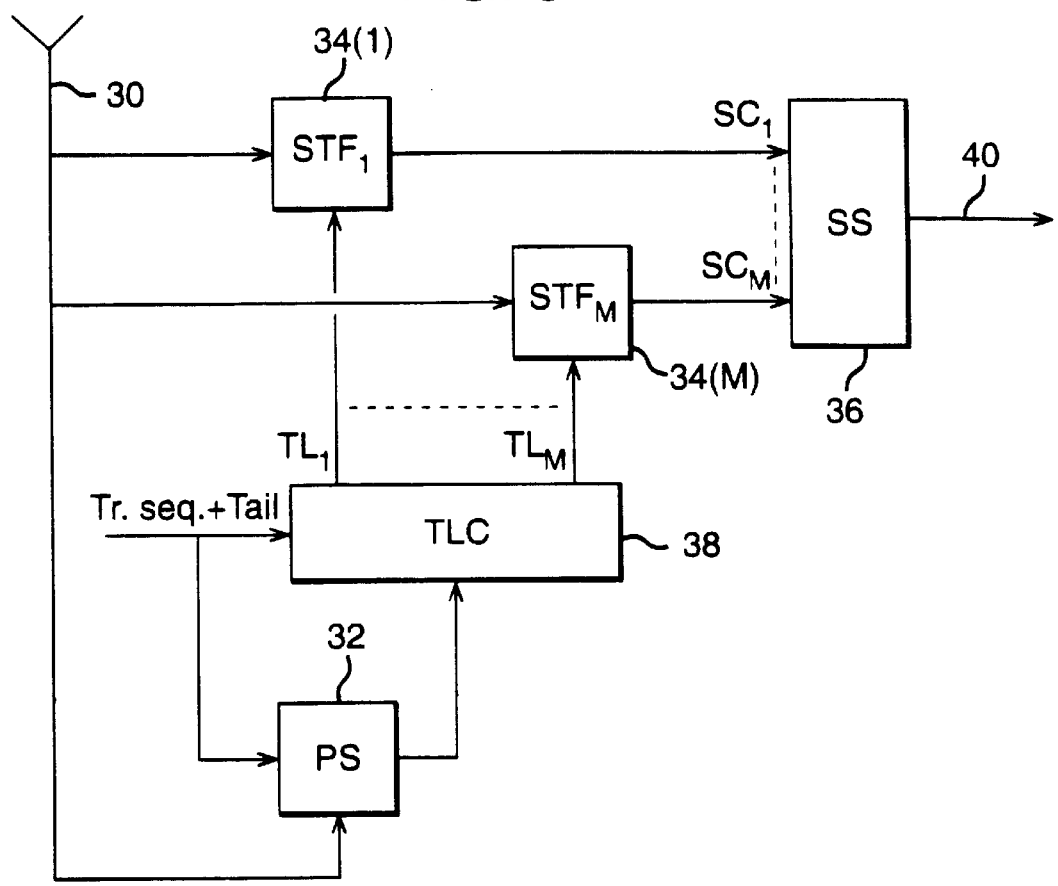
FIG. 3 is a block diagram of a signal processing unit.

FIG. 3 shows apparatus for processing information in the format of the signal shown in FIG. 2. An antenna array 30 is connected to a position selector 32, and also to each of an array of Spatio-Temporal Filter (STF) blocks, $STF_1$ to $STF_M$, reference 34 (1) to 34(M). The output SC of each block is connected to a signal selector 36; the outputs $SC_1$ to $SC_M$ can be regarded as signal candidates, as only one such signal is used by the signal selector 36.

The part of the signal from the antenna array 30 corresponding to the training sequence 14 and both tails 16, 18 is supplied to the position selector 32, and also to a training-like sequence combiner 38. The combiner 38 also receives a signal from the position selector 32 indicating whether the left or right end of the timeslot is more affected by Co-Channel Interference (CCI)—the selector is described in more detail below.

Reference has been made above to the use of the finite alphabet FA in one method of CCI rejection. In the inventive method and apparatus, the number M of STF blocks is derived by $M=h^T$, where h is the number of symbols in the FA and T is the number of training-like symbols in the bands 24, 26 at each end of the timeslot.

Figure 4:
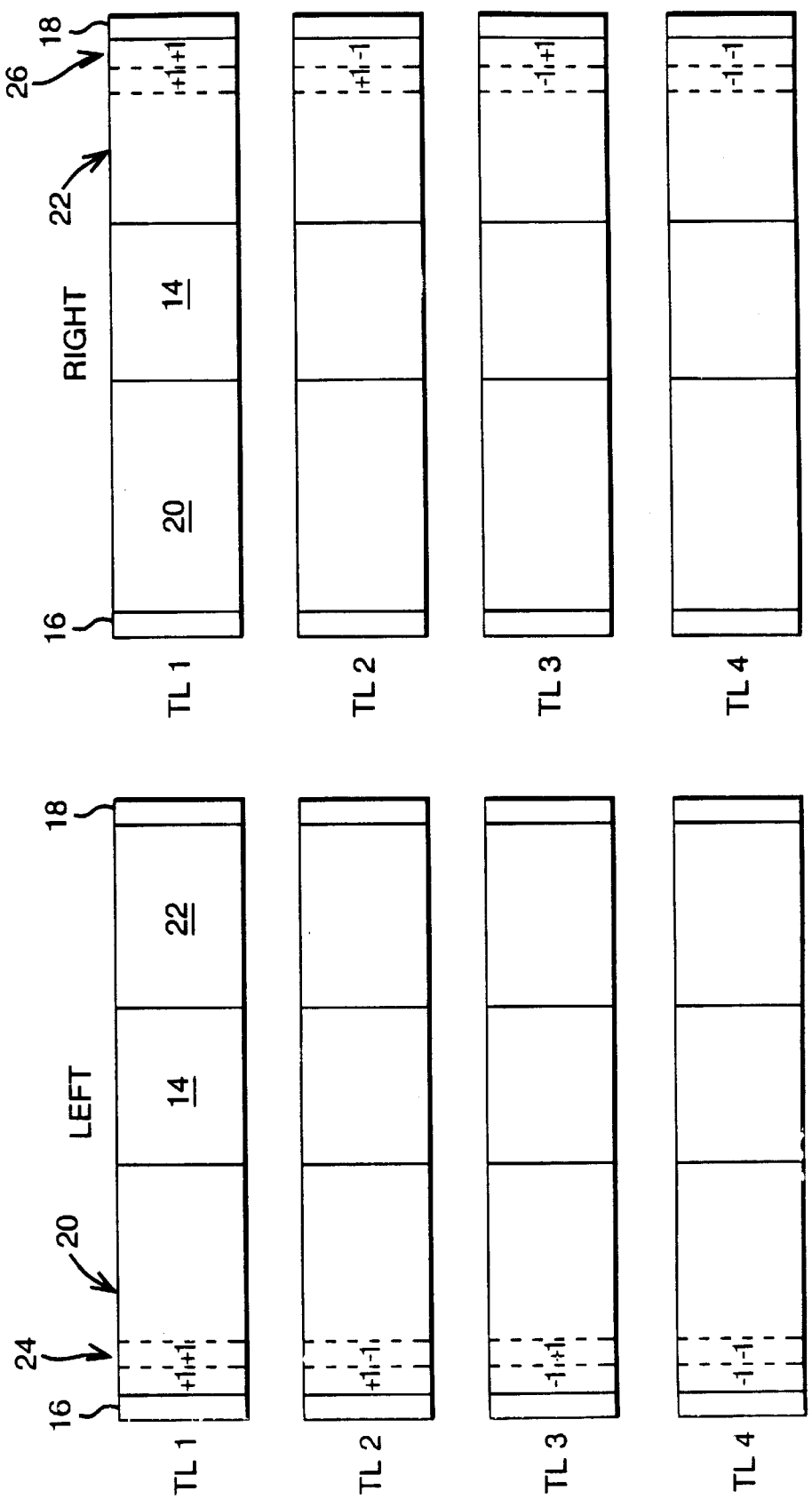
FIG. 4 illustrates four possible training-like sequences for both left hand and right hand ends.

In GSM, the FA is binary, that is h=2, and in one example shown in FIG. 4 two symbols can be used, thus M=4.

FIG. 4 illustrates, for both the left and right ends of the timeslot, four possible arrangements each with a different training-like symbols sequence TL in the bands 24, 26. Thus in the first example TL1 left, the 2 training-like symbols are +1, +1; in the second example TL2 left, the training-like symbols are +1, −1, in TL3 they are −1 +1, and in TL4 they are −1 −1. The same combinations of symbols are used for the training-like symbols at the right hand end of the timeslot.

With the provision of only four training-like symbols in each timeslot, there is minimal loss of pay load capacity, but by use of the invention there is a marked improvement in CCI rejection ability.

Referring once more to FIG. 3, each of the STFs 34 is loaded with the same training-based or semi-blind algorithm, known from the prior art, especially the prior art referenced above. Each STF 34 receives from the training-like sequence combiner 38 an input corresponding to one of the combinations of training-like symbols illustrated in FIG. 4; either the left hand or right hand set is supplied, in accordance with the left/right signal received by the combiner 38 from the position selector 32.

Each STF 34 responds to the signal from the combiner 38 to operate, in accordance with its algorithm, on the signal from the antenna array 30 to enhance the desired signal and reject CCI signals. Each STF 34 supplies its output, designated signal candidates SC1 to SCM, to the signal selector 36. The signal selector 36 selects the signal candidate having the minimum distance from the FA, and outputs that signal as an estimated signal 40; the estimated signal is processed by the remainder of a conventional GSM receiver/mobile system.

Figure 5:
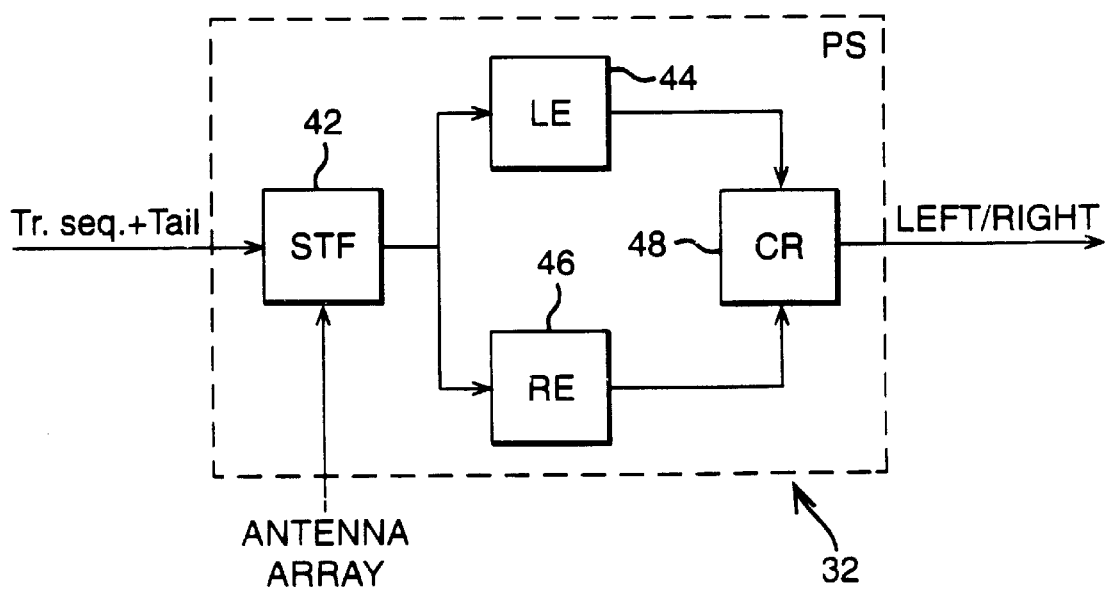
FIG. 5 is one embodiment of a position selector for incorporation into the unit of FIG. 2.

FIG. 5 shows one arrangement providing a position selector 32. The selector comprises an STF 42 arranged to receive inputs from the antenna array 30, and also the part of the signal from antenna array 30 corresponding to the training sequence 14 and both tails 16, 18. STF 42 is connected to left and right estimators 44, 46 and to a comparison device 48.

The STF 42 is loaded with the same training-based or semi-blind algorithm as the STF 34 in FIG. 3, and uses this algorithm on the training sequence (reference 14 in FIG. 2) and tail symbols (16, 18 in FIG. 2), but there is no input of the additional training-like symbols to this STF. The output of the STF 42 (which comprises estimated information symbols) passes to the estimators 44, 46 which each calculate the distance of the respective right (22) and left (20) estimated information signals from the FA. The calculated distances are compared by the comparison device 48, the longer distance is selected, and the output indicates left and right accordingly, i.e., the comparison device indicates which end, left or right, of the timeslot is more affected by CCI.

Referring again to FIG. 3, the left/right signal from the position selector 32 is supplied to the combiner 38, which combines the training and left or right tail symbols with the left or right training-like symbols and passes them to the STFs 34. Thus the STFs 34 apply the algorithm based on the training sequence enlarged at the end of the timeslot which is more affected by interference. Effective asynchronous CCI rejection is achieved for one of the STFs 34(corresponding to the actual combination of values in the selected band 24 or 26). Signal selector 40 selects the output signal of this STF 34 using the criterion of the minimum distance from the FA.

It is to be understood that once the end of the timeslot more affected by CCI has been determined, the decision is valid for the remainder of that burst. For a new burst, a new estimation of left/right end must be made.

Figure 6:
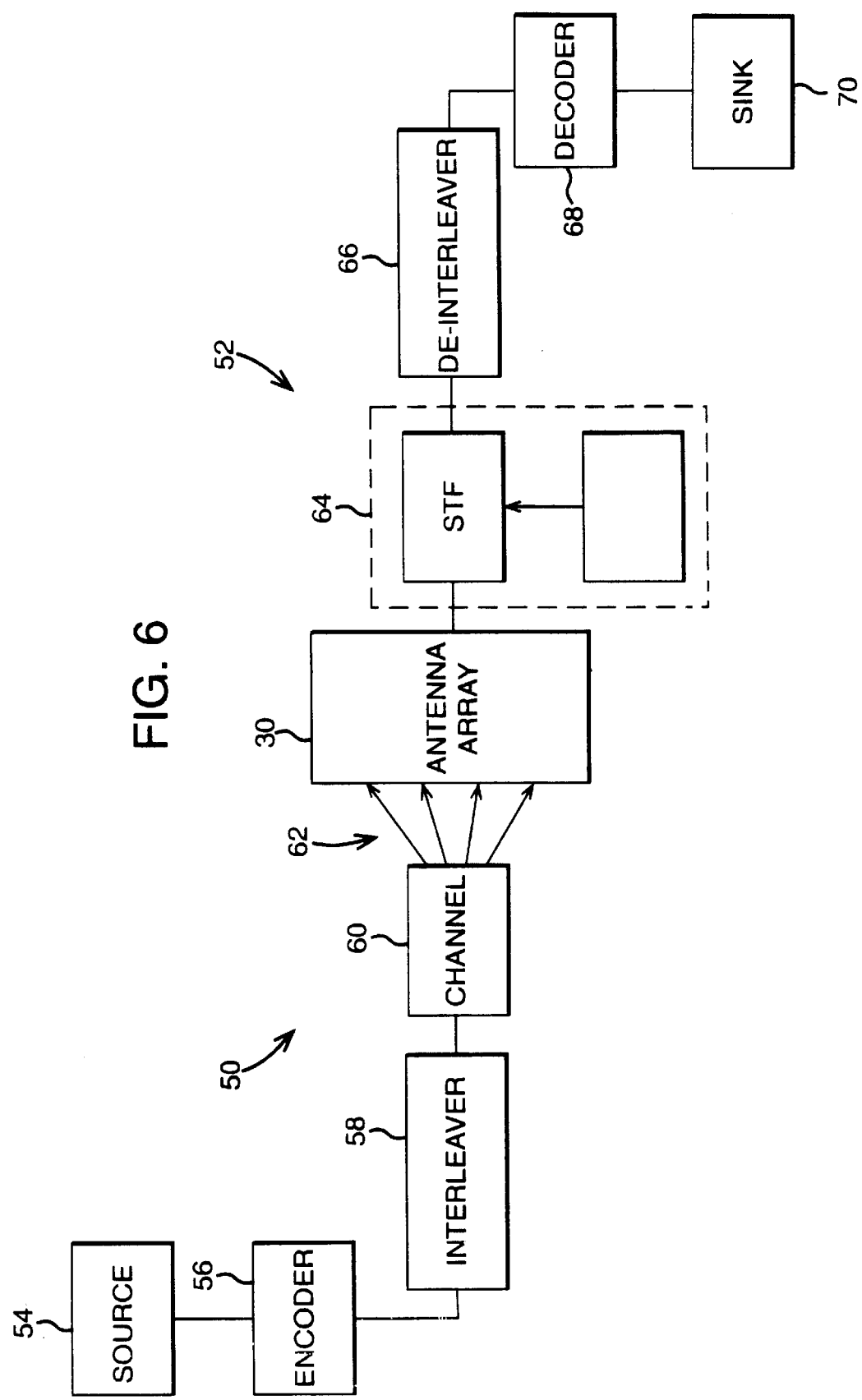
FIG. 6 illustrates a GSM receiver incorporating the invention.

FIG. 6 shows a GSM transmitter 50 and receiver 52. The conventional transmitter comprises a data or speech source 54, an encoder 56, an interleaver 58 and channel selector 60 which sends out signals on a number of channels 62. In the receiver 52, a signal is received by an antenna array 30 and passes through an interference canceller and equalizer 64, according to the invention, to a de-interleaver 66 and a decoder 68 to a data or speech sink 70 which receives an interference-free signal.

Figure 7:
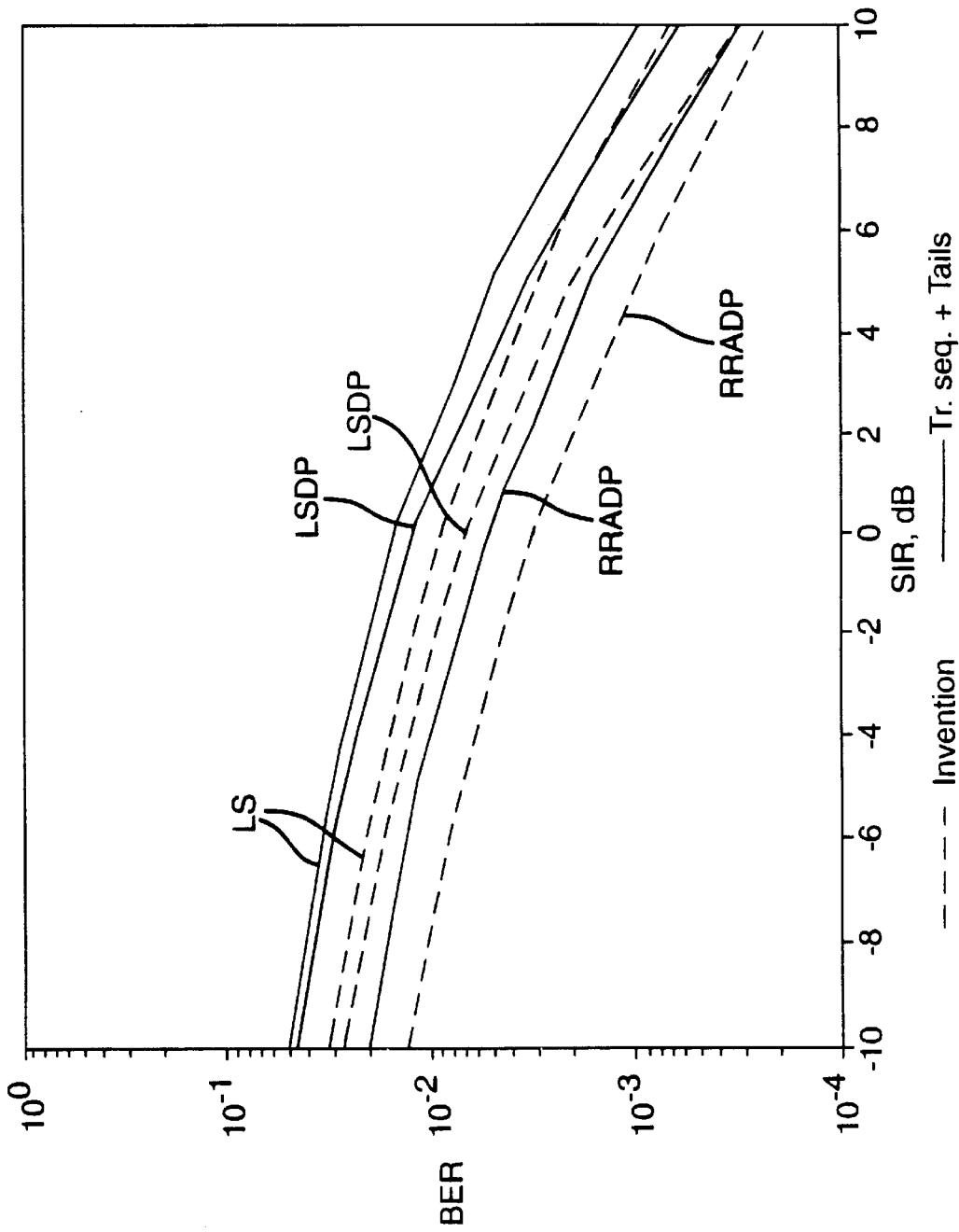
FIG. 7 is a plot of simulation results applying the invention by three different algorithms to an asynchronous arrangement.

FIG. 7 shows plots for three known algorithms, Least Squares (LS), Least Squares with Decoupled Projection (LSDP) and Regularized Algorithm with Decoupled Projection (RADP). For each algorithm, plots are given of bit error rates (BER) against Signal to Interference Ratio (SIR) for application of training sequence plus tail symbols, shown by full lines; and of the use of training sequence plus tail symbols plus training-like symbols, shown chain dotted. The calculations were based on two antenna array elements separated by 2.5 wavelengths in a typical GSM urban scenario TU50 where T=2. It can be seen that application of the invention gives a significant improvement for all three algorithms, but especially for RADP, when the improvement is more than 3 dB at BER=1%.

Figure 8:
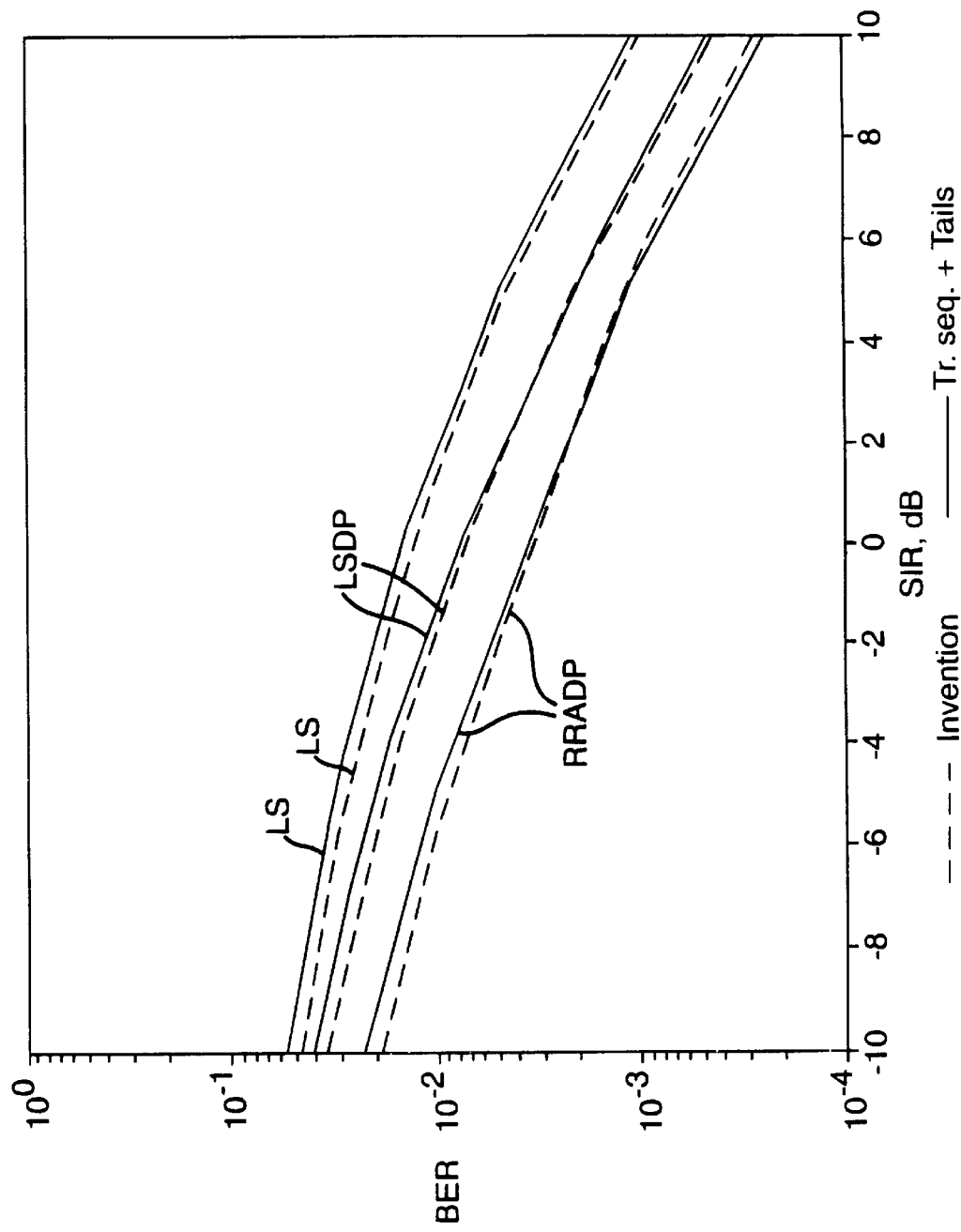
FIG. 8 is a similar plot for a synchronous arrangement.

FIG. 8 shows similar simulation results for the case of two synchronous CCIs with the same power and environment as in FIG. 7. Since two additional training symbols cannot provide significant additional information in the synchronous case, the improvement is very slight, as is expected. In the asynchronous case, even a small amount of additional information about the part of the CCI which does not overlap the training sequence can improve the performance.

In addition to canceling interference, application of the invention also provides channel equalization.

In addition to application to GSM, the invention can be applied to EDGE, when a number of training-like sequences TL in FIG. 4 has to be increased for the same number of training-like symbols, in accordance with the larger FA of EDGE.

It is to be noted that if the training-like symbols at both ends of the timeslot were to be processed, the complexity of the solution would be of the order $O(h^{2T})$; since processing of the symbols at one end, i.e., the end less affected by CCI is practically useless, the complexity of the useless effort is of the order $O(h^T)$. By sensing which end of the timeslot is more affected, and processing only the training-like symbols at that end, an efficient solution is achieved.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. In a radio telecommunications system in which each timeslot comprises a first tail band, a first data payload, a midamble sequence of training symbols, second data payload, and a second tail band, a method of co-channel interference rejection comprising the steps of
   determining which of the two ends of a timeslot suffers more from co-channel interference than the other end;
   selecting as training-like symbols a plurality of symbols in the data payload adjacent the tailband at said end,
   and utilizing the training-like symbols and the tail band symbols at said end and the midamble training symbols in an algorithm to reject co-channel interference.

2. A method according to claim 1 in which the number of training-like symbols is selected in accordance with the Finite Alphabet applicable to the telecommunications system.

3. A method according to claim 1 in which the radio telecommunications system is GSM and two training-like symbols are selected at each end of the timeslot.

4. A method according to claim 3 in which the algorithm is a training-based or semi-blind algorithm.

5. A co-channel interference rejection processing unit for a radio telecommunications system comprising
   antenna means for receiving radio telecommunication signals in a plurality of timeslots, each timeslot comprising a first tailband, a first data payload, sequence of training symbols at a midamble position, a second data payload, and a second tailband; and spatio-temporal filter means;
   comparison means for determining which end of a timeslot suffers more from co-channel interference than the other end; and
   selection means to select a plurality of training-like symbols from the data payload symbols adjacent the tailband at said end;
   the spatio-temporal filter means being arranged to operate on the training-like symbols and the tailband symbols at said end, and the midamble training symbols to reject co-channel interference from a received signal.

6. A unit according to claim 5 in which there are M spatio-temporal filters where M equals the number of symbols in the Finite Alphabet of the radio telecommunications system, raised to the power of the number of training-like symbols at each end of the timeslot.

7. A unit according to claim 6 for GSM in which the number of filters is four.

8. A unit according to claim 5 in which a training-like sequence combiner is arranged to select the plurality of training-like symbols, to combine the training-like symbols with the tail symbols at that end of the timeslot and with the midamble training symbols.

* * * * *